United States Patent [19]

Osato

[11] Patent Number: 5,410,521
[45] Date of Patent: Apr. 25, 1995

[54] METHOD AND APPARATUS FOR RECORDING INFORMATION ON A MEDIUM HAVING BIAXIAL MAGNETIC ANISOTROPY USING PARALLEL AND PERPENDICULAR MAGNETIC FIELDS

[75] Inventor: Yoichi Osato, Yokohama, Japan

[73] Assignee: Canon Kabushiki Kaisha, Tokyo, Japan

[21] Appl. No.: 11,847

[22] Filed: Jan. 28, 1993

Related U.S. Application Data

[63] Continuation of Ser. No. 378,823, Jul. 12, 1989, abandoned.

[30] Foreign Application Priority Data

Jul. 15, 1988 [JP] Japan .................................. 63-174965

[51] Int. Cl.⁶ .............................................. G11B 13/04
[52] U.S. Cl. ....................................... 369/13; 360/114; 360/59
[58] Field of Search ....................... 369/13, 14; 360/59, 360/66, 114; 365/122

[56] References Cited

U.S. PATENT DOCUMENTS

| | | | |
|---|---|---|---|
| 3,521,294 | 7/1970 | Treves | 360/59 |
| 3,876,994 | 4/1975 | Calhoun | 365/30 |
| 4,343,038 | 8/1982 | Enz | 365/30 |
| 4,857,415 | 8/1989 | Tustison | 428/620 |
| 4,938,915 | 7/1990 | Saito | 369/13 |

FOREIGN PATENT DOCUMENTS

| | | |
|---|---|---|
| 57-60506 | 4/1982 | Japan ...................................... 360/66 |
| 61-214257 | 9/1986 | Japan . |
| 62-80810 | 4/1987 | Japan . |

*Primary Examiner*—Hoa T. Nguyen
*Attorney, Agent, or Firm*—Fitzpatrick, Cella, Harper & Scinto

[57] ABSTRACT

A method of information recording on a magnetic recording medium by applying a first magnetic field to the medium in a direction perpendicular to the surface of the substrate; and applying a second magnetic field to the medium in a direction along the surface of the substrate, wherein in at least one of the first and second magnetic fields, the direction of magnetic field varies according to the information and an apparatus for information recording on the magnetic recording medium features a first magnetic field generator for applying to the medium a magnetic field in a direction perpendicular to the surface of the substrate and a second magnetic field generator for applying to the medium a magnetic field in a direction along the surface of the substrate, wherein at least one of the first and second magnetic field generators varies the direction of magnetic field according to the information.

1 Claim, 3 Drawing Sheets

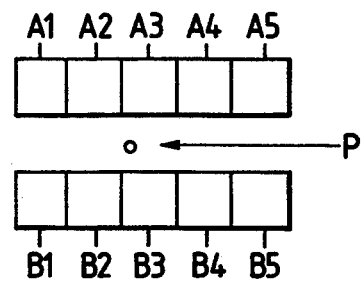
FIG. 5
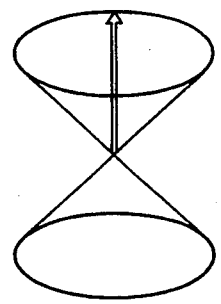
FIG. 6
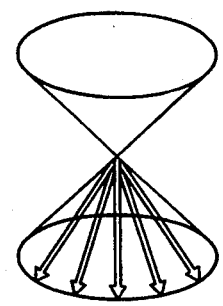
FIG. 7
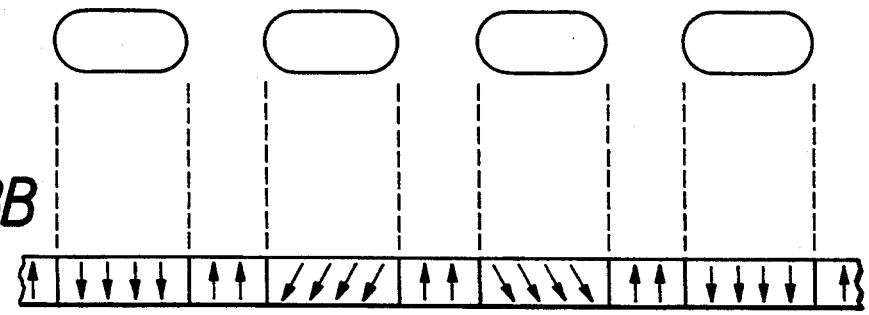
FIG. 8A
FIG. 8B

METHOD AND APPARATUS FOR RECORDING INFORMATION ON A MEDIUM HAVING BIAXIAL MAGNETIC ANISOTROPY USING PARALLEL AND PERPENDICULAR MAGNETIC FIELDS

This application is a continuation of application Ser. No. 07/378,823 filed Jul. 12, 1989, now abandoned.

BACKGROUND OF THE INVENTION

1. Field of the Invention

The present invention relates to a magnetic recording medium adapted for use in a large-capacity memory, electronic filing systems and the like, as well as to a method and an apparatus for recording information on such medium.

2. Related Background Art

A magnetooptical recording medium is already known as an erasable recording medium. The magnetooptical recording medium is capable of recording with a small pit (of about 1 $\mu$m) at a density about 100 times greater than when recording with in-surface magnetic recording media. Such media are expected to have applications as the files of high-quality images, recording moving images, etc., and the development of technology for further improving their recording density is strongly desired.

The above-mentioned magnetooptical recording medium is usually composed of a substrate and a magnetic recording layer formed thereon and has a magnetic anisotropy in a direction perpendicular to the surface of the substrate. Information recording is achieved by applying a magnetic field to the magnetic recording layer in a direction to invert the direction of magnetization and irradiating with a laser beam a pit area to be recorded to elevate the temperature of the pit area above the Curie temperature, Thereby, magnetization is inverted at the pit are. Also, information reproduction is achieved by irradiating the medium with a laser beam and detecting the information signal from the change in the state of polarization in the reflected or transmitted light. Such so-called Curie temperature recording, wherein information is recorded by inversion of magnetization by temperature increase of a vertical magnetization film beyond the Curie temperature in the presence of a biasing magnetic field, is considered to be suitable for high density recording.

However, for achieving a higher recording density, the binary recording of each bit by the direction of magnetization (upward and downward) of the magnetic recording layer becomes a limitation. The present recording density of the magnetooptical recording medium is largely determined by the wavelength of semiconductor laser (which is approximately equal to the beam diameter; about 800 nm at present). For example, to double the recording density of the media requires a semiconductor laser with a wavelength of 570 nm (800/$\sqrt{2}$), but such a laser has not yet been developed. However, a doubled recording density is achievable if two magnetic recording films are superposed, whereby each bit has four values due to the combination of the directions of magnetization of the films. The recording-/reproduction speed will also be doubled if the recording and reproduction can be conducted at the same speed as is used in conventional binary recording or reproduction. In fact, an even higher recording density or recording/reproduction speed is be achievable if it is possible to record a larger number of values.

There have already been proposals disclosed, for example, in Japanese Laid-Open Patent No. 59-116905 and U.S. Pat. No. 4,612,587, for multi-value recording by employing plural magnetic recording layers and controlling the direction of magnetization of each layer. However, such proposals have been associated with drawbacks such as requiring a laser source of multiple wavelengths, or excessively complicated recording medium construction or method recording/reproduction.

SUMMARY OF THE INVENTION

The object of the present invention is to provide a magnetic recording medium which is not plagued with the drawbacks of the prior technology. Thus, one object of the present invention is to provide a magnetic recording medium that is easily capable of high-density information recording, as well as a method of using the same and an apparatus therefor.

The above-mentioned objects are attained according to the present invention by a magnetic recording medium, comprising:
  a substrate; and
  a magnetic recording layer formed on said substrate and having biaxial magnetic anisotropy both in a direction perpendicular to the surface of the substrate and in a direction along said surface.

The method of information recording on the recording medium of the present invention comprises steps of:
  applying a first magnetic field, to said medium, in a direction perpendicular to the surface of the substrate; and
  applying a second magnetic field, to said medium, in a direction along the surface of the substrate;
  wherein, in at least one of said first and second magnetic fields, the direction of magnetic field varies according to said information.

Additionally, the apparatus for information recording on said medium comprises:
  first magnetic field generating means for applying, to said medium, a magnetic field of a direction perpendicular to the surface of said substrate; and
  second magnetic field generating means for applying, to said medium, a magnetic field of a direction along the surface of the substrate;
  wherein at least one of said first and second magnetic field generating means is adapted to very the direction of magnetic field according to said information.

BRIEF DESCRIPTION OF THE DRAWINGS

FIG. 5 is a top view of a bias magnetic field generating unit for generating a bias magnetic field along the surface of the substrate;

FIG. 6 shows the direction of magnetization at erasure in the recording method of the present invention;

FIG. 7 shows the direction of magnetization in multi-value recording in the recording method of the present invention; and FIGS. 8A and 8B shows the state of magnetization of recording bits according to the present invention.

DESCRIPTION OF THE PREFERRED EMBODIMENTS

The present invention will now be explained in detail by reference to an embodiment thereof utilizing a magnetooptical disk, shown in FIGS. 1–8. The magnetic recording layer with biaxial magnetic anisotropy, employed in the present invention, exhibits the magnetization curve shown in FIG. 1, in which the abscissa represents the applied magnetic field while the ordinate represents the magnitude of magnetization. When the magnetic field is applied perpendicularly to the surface of the substrate, magnetization takes place as is indicated by a solid line with a large coercive force and a high squareness. On the other hand, also when the magnetic field is applied in a direction along the surface of the substrate, a superior magnetization property having a high squareness as indicated by a broken line, is obtained, although the coercive force is reduced. The coercive force is preferably equal to or greater than 1K Oe in both the perpendicular and longitudinal directions. Also the squareness ratio is preferably equal to or greater than 0.8 in the perpendicular direction and is preferably equal to or greater than 0.5 in the longitudinal direction.

Figure 1:
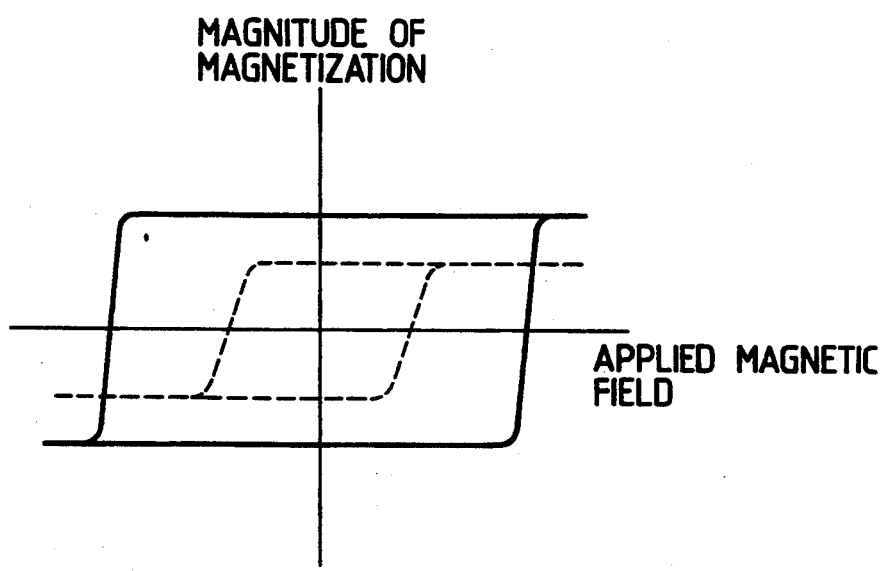
FIG. 1 shows the stable direction of magnetization of the magnetic recording layer of the present invention.
Figure 2:
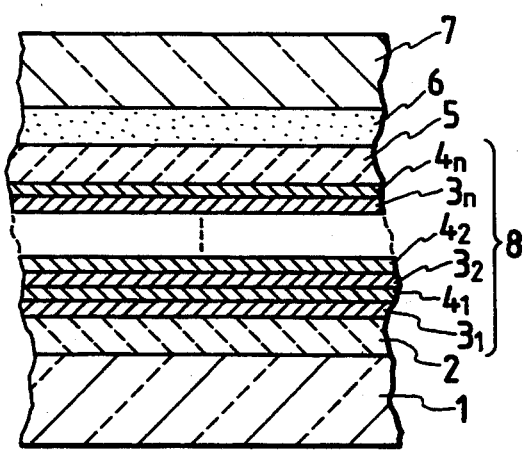
FIG. 2 is a cross-sectional of an embodiment of the magnetic recording medium of the present invention.

A magnetic recording layer having a biaxial magnetic anisotropy can be obtained by alternately laminating at least two sets of a thin film comprising a rare earth element and a thin film comprising a transition metal, an embodiment of which is illustrated in the magnetooptical disk of FIG. 2. In FIG. 2, there are illustrated a disk-shaped transparent substrate 1 (composed of glass, plastic material or the like), a subbing layer 2 (composed of a dielectric material such as $Si_3N_4$) a magnetic recording layer 8 and a protective layer 5 (composed of a dielectric material such as $Si_3N_4$). The layers mentioned above are formed in succession on the substrate and are covered by a protective plate 7 (composed of glass, a plastic material or the like) adhered by an adhesive layer 6.

Magnetic recording layer 8 is composed of first thin films ($3_1, 3_2, \ldots, 3_n$ comprising a rare earth element) and second films ($4_1, 4_2, \ldots, 4_n$) comprising a transition metal, at least two sets of which are alternately laminated. The first and second thin films of the first set preferably have a total thickness in the range of approximately 15–40 Å. A smaller thickness than 15 Å provides a vertical magnetic film and is thereby difficult to magnetize longitudinally. On the other hand, a larger thickness than 40 Å provide a longitudinal magnetic layer which does not exhibit satisfactory biaxial anisotropy. The preferred thickness of the set of thin films, of course, depends on the magnetic materials to be employed and is determined by considering the characteristics of vertical and longitudinal magnetization. The total thickness of the magnetic recording layer 8 is preferably within a range of approximately 100–2000 Å.

The first films are advantageously composed of Gd, Tb, Dy or alloys thereof, and the second films are advantageously composed of Fe, Co or alloys thereof. Particularly preferred examples of the combinations of the films are Tb/FeCo or Dy/FeCo because of their low Curie temperature and a relatively high S/N ratio.

These films can be prepared readily by well-known methods, such as sputtering or vacuum evaporation.

The laminated structure may be obtained by a method wherein various substrate targets are provided when the magnetic material is formed, and the film is formed while the substrate is rotated. By this method, the thickness of the paired films can be controlled by varying the revolution or the distances from the targets.

Figure 3:
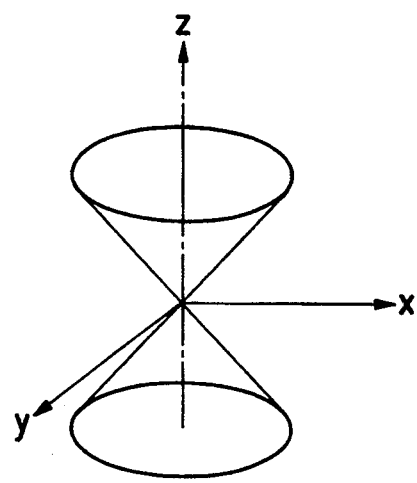
FIG. 3 shows the magnetization curve of the magnetic recording layer of the present invention.

FIG. 3 shows the stable direction of magnetization of the recording layer in the magnetic recording medium according to the present invention, with biaxial magnetic anisotropy wherein the z-axis is perpendicular to the surface of substrate, and the x-y plane is parallel to the substrate surface More specifically, the magnetization is stable upwards or downwards in the direction perpendicular to the surface of the substrate, but can also be directed arbitrarily along said surface, so that the synthesized magnetization assumes a direction lying on the cone shape shown in FIG. 3. A method of information recording and reproduction utilizing the above-explained magnetic recording layer with biaxial magnetic anisotropy is explained below.

Figure 4:
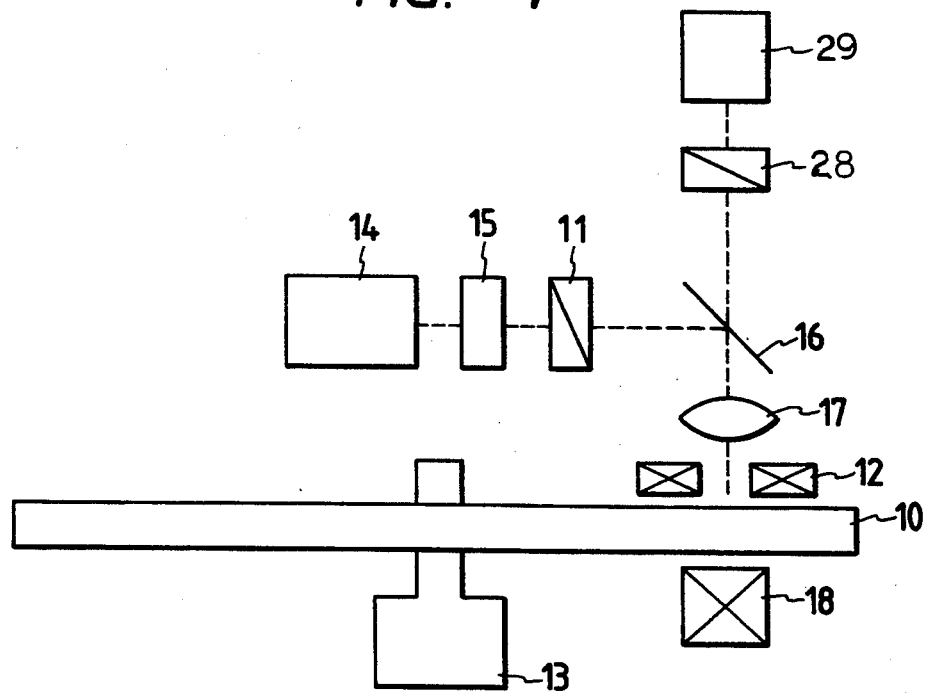
FIG. 4 is a schematic view of an embodiment of an apparatus for magnetooptical recording according to the present invention.

One example of an apparatus for use in the magnetooptical recording process of the present invention is shown in FIG. 4. Methods of erasure, recording and reproduction are explained below, with reference to FIG. 4. A light beam emitted from a light source 14 such as a semiconductor laser is transmitted through a light modulator 15 and a polarizer 11, and reaches a half-mirror 16, where the light beam is partially reflected and reaches a magnetooptical disk 10 of the present invention through an objective lens 17. The beam reflected by the disk 10 is transmitted through objective lens 17, half-mirror 16 and a detector 28, and reaches a photoelectric converting element 29. The magnetooptical disk 10 is rotated by a spindle motor 13. While recording, the intensity of the beam from the light source 14 is modulated either directly or by the light modulator 15 according to the recording signal. At the same time, bias magnetic fields corresponding to the recording signal are applied by a bias magnetic field generating unit 18 for the vertical direction to the substrate and a bias magnetic field generating unit 12 for the longitudinal direction to the substrate. The generating unit 12 for the longitudinal direction to the substrate is constructed as shown in FIG. 5 (when seen from above) and is provided with a group of coils A1–A5 and another group of coils B1–B5 positioned across the incident point P of the laser beam. Electric currents are applied to one of the coils A1–A5 of the first group and to one of the coils B1–B5 of the second group to generate a longitudinal magnetic field in a direction connecting said energized coils which is modulated according to the recording signal.

Before recording information on the magnetooptical recording medium, the medium is erased in the following manner. Referring to FIG. 4, the magnetooptical disk 10 is rotated and irradiated by a continuous laser beam, and a magnetic field of approximately 50–500 Oe of a direction opposite to that in the recording is applied by the vertical magnetic field generating unit 18. At the same time, a magnetic field (for example, a direction A3–B3 shown in FIG. 5) is applied by the longitudinal direction bias field generating unit 12. This eraisng operation aligns the magnetization of the recording layer of the present invention in a direction as shown in FIG. 6.

Recording may then be conducted as described with reference to FIG. 4, wherein the rotating magnetooptical disk 10 is irraidated with the laser beam modulated according to the recording signal, and a magnetic field of approximately 50-500 Oe in a direction opposite to that in the erasing operation is applied by the vertical direction bias field generating unit 18. At the same time a magnetic field of approximately 50-500 Oe is applied by the longitudinal direction bias field generating unit 12, with varying combinations of the coils A1-A5 and B1-B5 shown in FIG. 5 according to the recording signal, thus varying the direction of the longitudinal magnetic field. According to this recording operation, the magnetization of the recording film of the present invention can assume multi-value states as shown in FIG. 7, by the variation of direction of the longitudinal magnetic field according to the recording signal.

It is also possible to vary the direction of the bias magnetic field applied along the substrate surface while irradiating the intensity modulated laser beam (the output of the laser is varied) according to the recording signal with the light modulator 5 and the polarizer 11. In this case, if a high output laser beam with a high output is irradiated on the disk, the vector in the direction perpendicular to the surface of the substrate is inverted and as a result the recording as shown in FIG. 7 is effected.

When the power of the laser beam is small, recording is conducted such that the vector changes in the longitudinal direction only. The output change of the laser therefore enables recording about twice as much multi-value information. Also, the vector of the longitudinal direction bias field can assume 10 different directions in case of the combinations of the above-explained coils A1-A5 and B1-B5, but the number of said directions can be increased by increasing the number of coils in the bias field generating unit. Also the recording may be conducted with the vector of one direction only. An increase in the number of directions of the vector increases the amount of signals, But may reduce the S/N ratio. Consequently the number of directions is suitably selected according to the species and structure of the magnetic film. Thus, as explained previously, information recording can be realized utilizing three parameters of the direction of vector along the substrate surface in the perpendicular direction to the substrate surface and the laser beam intensity.

Below, referring to FIG. 4, is shown an example of signal reproduction, which can be conducted in the conventional manner. Rotating magnetooptical disk 10 is irradiated by a continuous light beam from the light source 14, and the reflected light is received by the photoelectric converting element 29 thorugh the detector 28. The magnetization of the recorded bit attains, for example, the state shown in FIGS. 8A and 8B. When seen from above disk 10, the bits are formed as shown in FIG. 8A, wherein the length of bit is determined by the pulse duration of the recording beam. FIG. 8B shows the state of magnetization of the recorded bits in cross section in the radial direction of the disk. In the recorded bits, the direction of magnetization in the vertical direction is inverted from that in the erased state, and that in the direction parallel to the surface of substrate is modified by the variation of the direction of in-plane magnetic field through different combinations of the coils A1-A5 and B1-B5 according to the recording signal. The reproducing light beam reflected from these bits exhibits a change in the polarized state due to the magnetooptical effect, but the variation in in-plane magnetization among the recorded bits can be detected efficiently by inclining the axis of the beam with respect to the surface of the substrate. Thus the above-explained method is capable of increasing the recording density by from 3 to 10 times, in comparison with the conventional magnetooptical recording film.

In the following there will be shown an examples and using preparation of the magnetooptical recording medium of the present invention.

Example 1

A polycarbonate disk substrate with guide grooves was subjected to sputtering with a $Si_3N_4$ target to obtain a $Si_3N_4$ film of a thickness of 700 Å. The disk was subjected to simultaneous sputtering with a $Fe_{85}Co_{15}$ alloy target and a Tb target with a substrate revolution of 8 rpm to obtain a $Tb_{19}Fe_{69}Co_{12}$ film of a thickness of 800 Å within 4 minutes. The film was composed of alternately laminated Tb films and FeCo films in which the thickness of a pair of said films (repeating cycle) was 25 Å. Sputtering was conducted subsequently with a $Si_3N_4$ target to obtain a $Si_3N_4$ film of a thickness of 1000 Å. The substrate was then adhered to a polycarbonate disk substrate with a hotmelt adhesive to obtain the magnetooptical recording medium.

The magnetization curve of thus completed magnetooptical recording medium (with $Tb_{19}Fe_{69}Co_{12}$ film) was measured with a sample vibration type magnetization measuring instrument. The coercive force in a direction perpendicular to the surface of the substrate was about 9 K Oe. In the direction parallel to the surface of the substrate, the coercive force was about 500 Oe, and the magnetization in the presence of applied magnetic field of approximately 1-2K Oe was about ½ of that in the perpendicular direction to the surface of the substrate, so that biaxial magnetic anisotropy was obtained.

The magnetooptical recording medium thus prepared was subjected to an erasing operation, under rotation of a linear speed of 3 mm/sec., by a laser beam with a power of about 6 mW and a vertical direction bias field of 500 Oe, as explained before. Then the recording operation was conducted by turning on and off a laser beam of 5 mW with a frequency of 1 MHz and with a duty ratio of 50%, and by applying bias fields of 200 Oe in the perpendicular direction to the surface of the substrate and of 200 Oe in the direction parallel to the surface of substrate, the latter direction being varied according to the recording signal.

Reproducing the thus formed recorded bits with a continuous light beam of 1 mW confirmed the presence of bit signals of respectively different signal levels. The magnetooptical recording medium therefore had a C/N ratio sufficient for multi-value recording (about 40 dB).

Example 2

A glass substrate provided with guide grooves and ultraviolet-hardened resin formed thereon was subjected, in a manner similar to Example 1, to the formation of a $Si_3N_4$ film of 900 Å, a $Dy_{20}Fe_{60}Co_{20}$ film of 800 Å and a $Si_3N_4$ film of 900 Å. The laminate structure of the $Dy_{20}Fe_{60}Co_{20}$ film was obtained in 4 minutes with a substrate revolution of 13.3 rpm, and the thickness of paired films was 15 Å. The measurement of the magnetization curve of said medium proved a coercive force of about 7K Oe in the perpendicular direction to the substrate surface, and a coercive force of about 1K Oe in the parallel direction to the substrate surface. The magnetizations in the presence of applied magnetic fields of approximately 1-2K Oe showed a ratio of about 0.6 between the parallel direction and the perpendicular direction, thus indicating the presence of biaxial magnetic anisotropy.

In the recording operation, the magnetic field was applied in the Example 1 except that the output of the laser beam was varied to 3 mW and 6 mW by the light modulator according to the recording signal. Afterwords, when the recorded bits were subjected to reproduction with a continuous beam of 1 mW, the bit signals whose reproduction signal level being varied respectively were confirmed, and C/N ratio was about 40 dB which was sufficient for multi-value recording.

The present invention is not limited to the above-described embodiments, but other various application thereof are possible. For example, whereas a magnetooptical disk was employed to explain the present invention, the present invention may also be applied to a magnetic recording medium for which the recording and/or reproduction is conducted with a magnetic head. Also, the shape of the recording medium is certainly not limited to a disk, but includes any other appropriate shape including a card, tape and the like.

Therefore, the present invention includes any and all such applications within the spirit and scope of the appended claims.

What is claimed is:

1. An apparatus for recording information on a magnetic recording medium comprising a substrate and a recording layer formed on the substrate and having biaxial magnetic anisotropy, one axis being in a direction perpendicular to the surface of the substrate and the other axis being in a direction parallel to the surface of the substrate by utilizing magnetization having a first vector perpendicular to the surface of the substrate and a second vector parallel to the surface of the substrate, comprising:

means for applying a light beam to the recording layer, the power of the light beam varying in accordance with the information, between a small power, which does not reverse the orientation of the magnetization vector of the recording layer in the direction perpendicular to the surface of the substrate, and a large power, which does reverse the orientation of the magnetization vector of the recording layer in the direction perpendicular to the surface of the substrate;

first magnetic field applying means for applying to the medium a first magnetic field in the direction perpendicular to the surface of the substrate; and second magnetic field applying means for applying to the medium a second magnetic field in the direction parallel to the surface of said substrate, wherein said second magnetic field applying means varies the second magnetic field in accordance with the information, wherein said second magnetic field applying means orients the magnetization vector of the recording layer in the direction parallel to the surface of the substrate according to the direction of the second magnetic field independently of the orientation of the magnetization vector of the recording layer in the direction perpendicular to the surface of the substrate, and wherein said second magnetic field applying means comprises first and second coil groups set so as to face each other in a plane parallel with the surface of the substrate, each of said first and second coil groups comprising a plurality of coils set in an array.

* * * * *

UNITED STATES PATENT AND TRADEMARK OFFICE
CERTIFICATE OF CORRECTION

PATENT NO. : 5,410,521
DATED : April 25, 1995
INVENTOR(S) : YOICHI OSATO

It is certified that error appears in the above-indentified patent and that said Letters Patent is hereby corrected as shown below:

Column 1

Line 25, "applications" should read --such applications--;
    Line 38, "temperature," should read --temperature.--;
    Line 39, "are." should read --area.--; and
    Line 43, "Such so-called" should be deleted.

Column 2

Line 11, "method" should read --method of--; and
    Line 57, "cross-sectional" should read --cross-section--.

Column 3

Line 55, "provide" should read --provides--.

Column 4

Line 14, "surface" should read --surface.--.

Column 5

Line 40, "But" should read --but --; and

"may" should read --may also --.

UNITED STATES PATENT AND TRADEMARK OFFICE
CERTIFICATE OF CORRECTION

PATENT NO. : 5,410,521
DATED : April 25, 1995
INVENTOR(S) : YOICHI OSATO

It is certified that error appears in the above-indentified patent and that said Letters Patent is hereby corrected as shown below:

Column 6

Line 8, "an examples and" should read --examples--; and
Line 9, "using preparation of" should read --of preparation and using--.

Column 7

Line 7, "the Example" should read --the same manner as in Example--.

Signed and Sealed this

Twenty-sixth Day of September, 1995

BRUCE LEHMAN

*Attest:*

*Attesting Officer*          *Commissioner of Patents and Trademarks*